(No Model.) 2 Sheets—Sheet 1.
H. C. HUNT.
POCKET KNIFE.
No. 407,863. Patented July 30, 1889.
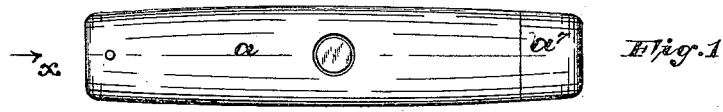
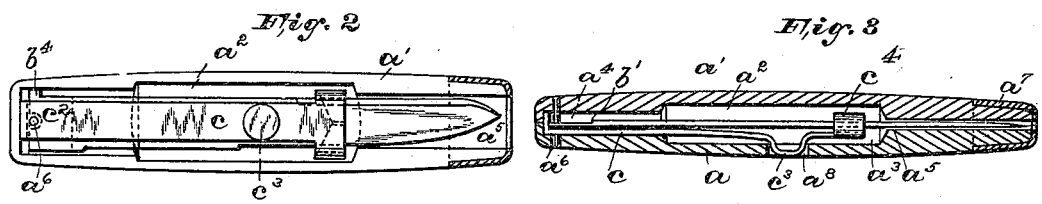
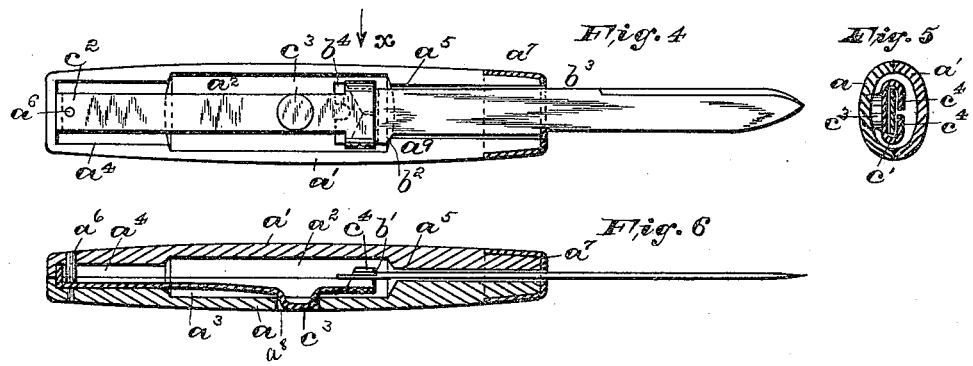
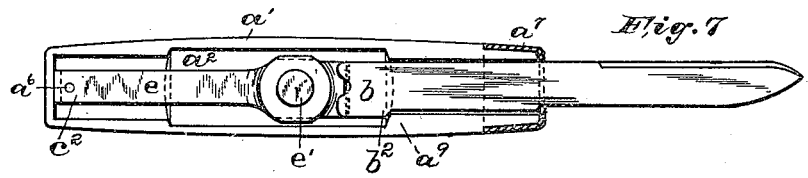
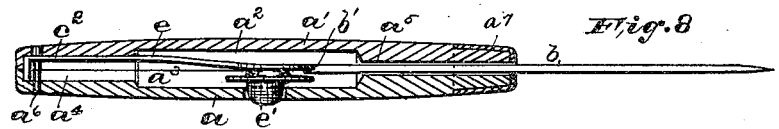
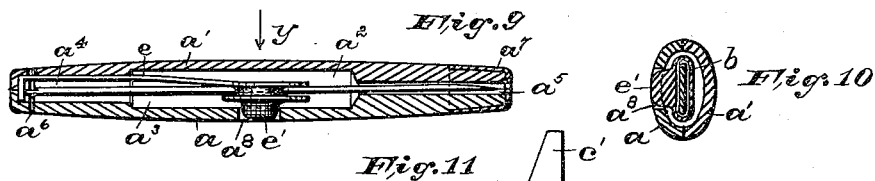
WITNESSES:
J. H. Pentire
George B. Adams
INVENTOR:
Henry C. Hunt.
BY Campbell & Co ATTYS.

(No Model.) 2 Sheets—Sheet 2.

H. C. HUNT.
POCKET KNIFE.

No. 407,863. Patented July 30, 1889.

WITNESSES:
J. N. Berhne
George B. Adams

INVENTOR:
Henry C. Hunt.
BY Campbell & Co. ATTYS

N. PETERS. Photo-Lithographer, Washington, D. C.

UNITED STATES PATENT OFFICE.

HENRY C. HUNT, OF NEWARK, ASSIGNOR OF ONE-HALF TO GEORGE B. ADAMS, OF IRVINGTON, NEW JERSEY.

POCKET-KNIFE.

SPECIFICATION forming part of Letters Patent No. 407,863, dated July 30, 1889.

Application filed January 18, 1888. Serial No. 261,120. (No model.)

*To all whom it may concern:*

Be it known that I, HENRY C. HUNT, a citizen of the United States, residing at Newark, in the county of Essex and State of New Jersey, have invented certain new and useful Improvements in Pocket-Knives; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in that class of pocket-knives in which the blade, instead of being hinged or pivoted to the handle, is so arranged that it is projected from and drawn within the end of the handle to open and close the blade.

The object of the invention is to produce a knife of this kind which is simple in operation and cheap in its construction; and as a further object the invention is designed to provide a handle with which tools of various descriptions may be used which are designed to be carried in the pocket, and because of such use it is necessary to protect the tool in order to prevent the same from doing injury.

In the accompanying sheets of drawings are illustrated several constructions which may be used in carrying out my invention, which are embraced within the generic idea.

In said views, Figure 1 is a side elevation of my improved handle, the knife blade or tool being concealed or withdrawn within the said handle. Fig. 2 is a longitudinal section of Fig. 1, showing the relation of the parts when the knife-blade is drawn within the handle. Fig. 3 is a section taken longitudinally through Fig. 1 on the line $x$. Fig. 4 is a view similar to Fig. 2, showing the blade projected from the handle. Fig. 5 is a section taken through $x$ on Fig. 4, and Fig. 6 is a view similar to Fig. 3, showing the knife-blade projected from the handle. Figs. 7, 8, and 9 are views similar to Figs. 4, 6, and 3, respectively, showing another construction of the device. Fig. 10 is a section taken through $y$ on Fig. 9; and Fig. 11 is a plan of a blank from which the spring shown in Figs. 1 to 6, inclusive, is made.

Figure 12:
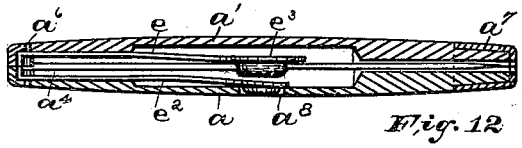
Figure 13:
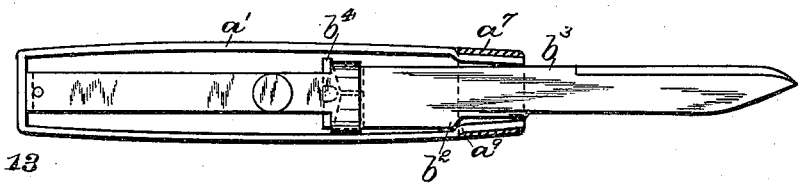
Figure 14:
Figure 15:
Figure 16:
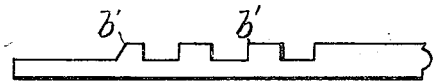
Figure 17:
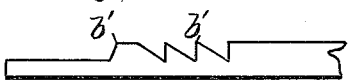
Figure 18:
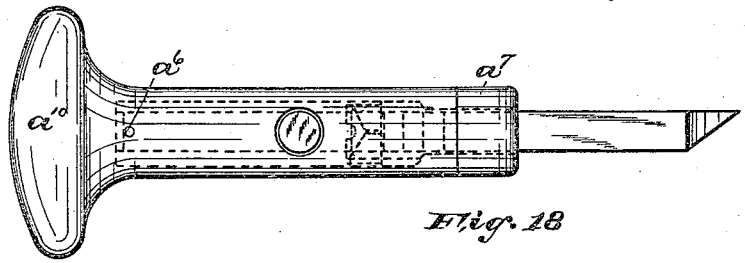
Figure 20:
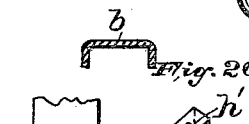
Figure 21:
Figure 22:
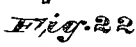
Figure 19:
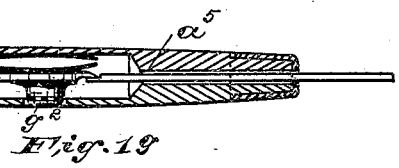
Figure 23:
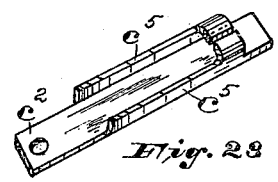

On Sheet 2, Figs. 12 and 13, are views similar to Figs. 3 and 4, showing other forms of construction, Fig. 13 representing a handle struck up from sheet metal. Fig. 14 is a side elevation of a handle provided with a spring finger-piece struck up from the sides thereof. Fig. 15 is a detailed view showing the relation of the holding-spring to the knife-blade. Figs. 16 and 17 are detailed views of the base or end of the knife-blade, showing different forms of holding-stops. Fig. 18 is a side elevation of the invention as designed for an engraver's use; and Fig. 19 is a sectional view similar to Fig. 12, showing a modified construction of the working parts of my invention. Fig. 20 is a section taken through the tang or lower end of the tool or knife-blade, showing lugs or guiding projections formed thereon. Fig. 21 is a view of a form of stop provided on the end of the tang. Fig. 22 is a perspective view of the end of the holding-plate adapted to engage with the form of stop shown in Fig. 21; and Fig. 23 is a perspective view of the catching or holding plate, showing a construction thereof which is provided with guiding-flanges thereon.

The invention disclosed in the above-described views consists, essentially, of a hollow or chambered handle provided with a slot or opening in either or both ends thereof, through which the knife or tool moves, and a holding-spring or a spring-actuated plate or bar concealed within the handle, by means of which the knife or tool is held and prevented from dropping back into the handle when in use, the disengagement of said holding spring or bar being effected by the operation of a suitable finger-piece accessible on the outside of said handle.

As illustrated in Figs. 1 to 6, inclusive, of the drawings, the handle consists of two sections $a$ and $a'$, each of which is recessed at $a^2$ and $a^3$ to form an inclosed chamber to permit of the requisite movement of the holding-spring, which chamber extends toward the solid or closed end of the handle, as shown in said figures, and in said chamber $a^4$ is secured the end of the holding-spring, and which also receives the base or end $b$ of the knife or knife-blade or tool when the same is permitted to drop into the interior of the handle.

Extending from the inclosed chamber out through the end of the handle when the half-sections thereof are united or placed together is an elongated slot $a^5$, through which the tool drops when the same is extended from the end of the handle when in use. As shown in the views on Sheet 1, the half-sections of the handle are held together at one end by a rivet or screw $a^6$ and the opposite ends of the half-sections are held together by means of a slotted ferrule or cap $a^7$, the slot in said ferrule corresponding to the long slot $a^5$ in the same end of the handle to permit of the reciprocal movement of the tool within the handle.

$c$ represents the holding spring or plate, which, as shown in Figs. 1 to 6, inclusive, and in Fig. 11, consists of a straight piece of spring metal provided on the catching or holding end thereof with arms $c'$, which are bent around the base or lower end of the tool, substantially as indicated in Fig. 5, leaving an opening in between the same, through which the tool moves as it is extended from and allowed to drop within the handle, the base or lower end of the tool being held in constant engagement with said arms, as indicated in Figs. 4 and 6. The opposite end $c^2$ of the said holding-spring is preferably bent up, as indicated in Fig. 3, and extending from side to side of the chamber $a^4$, so as to prevent any movements of the said end of the holding-spring, the rivet $a^6$ passing through said spring close to said turned-up end. A finger-piece $c^3$ is secured to or struck up from said spring and projects up through an opening $a^8$ in one of the half-sections of the handle, substantially as shown in Figs. 3 and 6. On the base or lower end of the knife blade or tool is formed a stop or projection $b'$, which, when the handle of the knife is held with the slotted end downward and the tool is allowed to drop through said end, enters into an engagement with the bent-over arms $c'$ of the spring, substantially as shown in Fig. 6. As the normal tendency of the spring is to press the finger-piece outwardly through the opening $a^8$, when the knife-blade is extended from the handle the portions $c^4$ are thrown into engagements with the notch or stop $b'$, as indicated in Fig. 6, thereby locking the blade in its extended position and preventing the same from being forced back into the handle. As the width of the slot $a^5$ is about of the thickness of the base or end of the knife-blade or tool, the same is held immovably within the slot, and hence cannot become disengaged from the end of the holding-spring by any force applied to the tool or knife. To release the tool and permit the same to drop into the handle, pressure is applied to the finger-piece $c^3$, which throws the portions $c^4$ out of engagement with the stop on the knife-blade, and in consequence thereof the knife-blade may readily drop through the opening formed by the bent-over arms $c'$ until it strikes the bottom or end of the chamber $a^4$, as indicated in Figs. 2 and 3. When the knife is thus allowed to fall within the handle, it is retained therein by the friction between the bent-over ends of the holding-spring and the knife-blade, owing to the constant tendency of the spring to press outwardly toward the opening in the handle. A shoulder $b^2$ on the base of the tool engages with a shoulder $a^9$ at the bottom of the slot $a^5$, to prevent the tool from dropping entirely from the end of the handle. This shoulder also performs another function, which is to crowd the back $b^3$ of the knife-blade up against the opposite side of the slot, and thus wedge the same firmly in position within the said slot $a^5$, and prevent any looseness and movement of the tool or knife-blade in the handle when the said tool or knife-blade is extended from the handle when in use.

As indicated in Fig. 4, a projection $b^4$ is formed on the end of the knife or tool to prevent the same from dropping through the opening formed by the bent-over arms $c'$. However the said projection $b^4$ may be dispensed with, as the shoulder $b^2$ effectually prevents any further outward movement of the knife-blade.

In the constructions heretofore described the blade or tool in dropping into the handle passes through an opening on the back of the holding-spring and drops in behind the holding-spring when the blade or tool is retained within the handle. According to the construction shown in Figs. 8, 9, and 10, an opening similar to that formed by the bent-over arms $c'$ is formed on the face of the holding-spring $e$, so that the knife drops in front of the said holding-spring between the same and the finger-piece $e'$. The opening shown in Fig. 10 may be formed similar to the opening formed by the arms $c'$, or may be made by uniting two plates together, substantially as shown in Fig. 9, with a space between them. When the finger-piece is formed on or secured to the spring, which acts to hold the tool in an extended position while in use, there is a slight difference of the relation of said finger-piece to the opening in the side of the handle through which the finger-piece is accessible—as, for instance, the finger-piece, when the blade is extended, projects farther outwardly through the opening in the handle than it does when the tool or blade is in its concealed position within the handle. This difference of position amounts very nearly to the thickness of the knife-blade. In Fig. 12 is shown a form of construction which is adapted to obviate this difficulty, in which the finger-piece is arranged independently of the holding-spring, being formed on or secured to a spring-piece $e^2$, which, as shown in Fig. 12, extends down within the chamber $a^4$ in the handle and is secured on the rivet $a^6$ similarly to the holding-spring; or said spring-piece and the holding-plate may be secured to the opposite sections of the handle by independent rivets, as will be understood. Thus it will be seen that the finger-piece remains in the same position with relation to the opening in the handle whether the knife is within or without the handle. Any inward pressure upon the finger-piece forces the spring to which it is secured against the slotted projection $e^3$ on the holding-spring $e$, through which the knife moves, and removes the friction between the same and the knife-blade and permits the same to drop through the open end of the handle, and also by the same inward pressure causes the disengagement of said holding-spring from the tool.

In Fig. 14 the spring $e^2$ is formed in the side of the handle itself when the same is struck up from sheet metal, as is indicated in Fig. 13. In Fig. 18 is illustrated a form of handle and tool intended especially for engravers' use, in which the handle is provided with a broadened end $a^{10}$, the body of the handle being formed cylindrically, and the opening or slot $a^5$ in the end of the handle being square to conform to the shape of the tool used in said handle.

In Fig. 19 is illustrated a form of construction in which a rigid bar $g$ is pivoted to a rivet $g'$, and to said bar is attached the finger-piece $g^2$, by which the same is operated. Behind said pivoted bar is arranged a spring $h$, which acts to retain the pivoted bar in holding engagement with the notched end of the tool or causes said bar to press against the knife-blade when the same has dropped within the handle, and by the friction thus exerted retains the knife-blade within the handle.

Instead of employing but a single stop on the end of the knife-blade or tool, a series of stops or notches may be provided, by means of which the knife-blade may be adjusted so as to project from the end of the handle in any desired distance. This is particularly advantageous in that class of tools in which the body or blade thereof becomes worn on the end thereof, and from frequent sharpening becomes shorter as it is used—such as, for instance, engravers' tools, chisels, &c. These stops may be formed as in Fig. 16, in which both ends of the slot form shoulders and prevent any outward or inward movement of the tool until the holding spring or bar is released by pressure applied to the finger-piece; or the said stops may be formed as shown in Fig. 17, which permits of the withdrawal of the tool from the handle to any desired extent without releasing the holding arm or bar, but prevents any inward movement of the tool until the holding spring or bar is disengaged from said stop. In Fig. 15 is a detailed view showing the surface of the notch or stop $b'$ slightly inclined, so that the greater the pressure applied to the tool the more firmly the end of the holding spring or bar wedges itself against the said stop.

In Fig. 21 is illustrated a form of stop provided on the lower edge of the tang or base of the knife or tool, which consists of a projection $h$, which enters a recess $h'$, formed on the bent-over end of the holding-plate, as indicated in Fig. 22, this construction being a slightly-different arrangement and construction of the holding-stop, and, taken together with the other forms of stops shown in the drawings, illustrate several of the different forms which may be used whereby the knife-blade or tool is prevented from being forced back into the handle when in use. When the tool is projected from the open end of the handle, the free end of the holding-plate enters into locking engagement with the stop or stops on the tang of the tool and remains in such engagement until released by pressure applied to the finger-piece, which is communicated to said holding-plate. Upon the releasing of the tool from its locking engagement with the holding-plate the tool is free to drop back into the handle by the elevation of the open end thereof, and when the said tool has dropped entirely within the handle the pressure upon the finger-piece is relieved, and the free end of said holding-plate presses against the side of the knife-blade or tool when the pressure is removed from the finger-piece, and thus the knife-blade or tool is effectually prevented from dropping or falling through the open end of the handle when the knife is carried within the pocket. In order to compel the tool to drop centrally within the handle, guides or flanges $c^5$ are formed on or secured to the spring-actuated holding-plate, substantially as indicated in Fig. 23; or similar flanges may be formed on the tool or knife-blade to accomplish the same result, of which the construction shown in Fig. 20 is an illustration. As indicated more particularly in Fig. 4, the shoulders $b^2$ and $a^9$ upon the tang of the tool and the interior of the handle at the open end, respectively, are inclined preferably of about the same angle, so that the purpose which these shoulders are designed to fill—namely, to force the back of the knife over toward the opposite side of the slot or opening in the end of the handle—is facilitated. In order to simplify the labor in putting the parts of the knife or tool together, a similar shoulder to $a^9$ may be formed on the opposite side of the handle, so that the half-sections of the knife-handle are made exactly alike, so that whichever way the tool or blade is inserted into the handle the shoulder $b^2$ on the tang will enter into engagement with one of said shoulders or stops.

The slot or opening $a^5$ in the end of the handle may vary in length according to the work to which the tool is to be applied in order to support the tang or end of the tool or knife-blade. The size or shape of the interior of the hollow or chambered handle may vary from the form and construction shown in the drawings, as will be understood.

Having thus described my invention, what I claim is—

1. A chambered tool-handle consisting of two sections held together by a ferrule or cap at one end and a rivet at the other end.

2. In combination, a hollow tool-handle having an open end and an opening in the side thereof, a tool moving through said open end and retained in said handle when not in use, and provided with a shoulder to prevent the tool from dropping out of the handle, and a stop or stops thereon, a spring-actuated plate having projections or flanges between which the tool passes when dropped within the handle, and a finger-piece projecting into the opening in the side of the handle and co-operating with the spring-plate, substantially as and for the purposes set forth.

3. In combination, a hollow tool-handle composed of sections held together by a ferrule and rivet at opposite ends thereof, one of said sections having an opening in the side thereof, and the end of said handle held together by the ferrule being open, a spring-plate arranged within said handle and extending toward the open end thereof, a finger-piece projecting into the opening in the side of the handle for operating said spring-plate, for the purposes specified, and a tool adapted to move through the open end of the handle and provided with a stop thereon with which said spring-plate engages when the tool is projected from the handle, said tool being permitted to drop within the handle and be retained therein by the pressure of the spring-plate against the same, substantially as set forth.

4. In combination, a hollow tool-handle composed of two sections held together by a ferrule and a rivet at opposite ends thereof, one of said sections having an opening in the side thereof, and the other end of said handle held together by the ferrule being open, a spring-tool holding-plate arranged within and secured to one of the sections of said handle and extending toward the open end thereof, a finger-piece on a spring-plate secured to the other of said sections and projecting into the opening in the side thereof and co-operating with the spring-tool holding-plate, for the purposes specified, and a tool adapted to move through the open end of the handle and provided with a stop thereon with which the spring-tool holding-plate engages when the tool is projected from the handle and retained therein by the pressure of the said spring-plate, substantially as and for the purposes set forth.

5. In combination, a chambered or hollow handle having an opening in the end thereof through which a tool may be projected, and an opening in the side thereof, a spring-actuated plate inclosed and secured within said handle and having a free end extending toward the opening in the end of the handle and provided with a loop thereon projecting toward the opening in the side of the handle, thereby providing an open space in said loop through which the tool can drop into the handle, a tool having a stop or notch thereon with which the free end of the spring-actuated plate engages automatically when said tool is projected from the handle, and a finger-piece arranged and working in the opening in the side of the handle, and when depressed engaging with the said loop on the spring-actuated plate, for the purposes set forth.

In testimony that I claim the invention set forth above I have hereunto set my hand this 14th day of January, 1888.

HENRY C. HUNT.

Witnesses:
FREDK. F. CAMPBELL,
FREDK. C. FRAENTZEL.